US012264060B2

(12) United States Patent
Heo et al.

(10) Patent No.: US 12,264,060 B2
(45) Date of Patent: Apr. 1, 2025

(54) COLD WATER PRODUCTION APPARATUS AND METHOD

(71) Applicant: COWAY Co., Ltd., Gongju-si (KR)

(72) Inventors: Sung-Hwan Heo, Seoul (KR); Hyun-Seok Moon, Seoul (KR); Min-Chul Yong, Seoul (KR); Hyun-Hee Lee, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 528 days.

(21) Appl. No.: 17/603,130

(22) PCT Filed: Apr. 28, 2020

(86) PCT No.: PCT/KR2020/005546
§ 371 (c)(1),
(2) Date: Oct. 12, 2021

(87) PCT Pub. No.: WO2020/222487
PCT Pub. Date: Nov. 5, 2020

(65) Prior Publication Data

US 2022/0185649 A1 Jun. 16, 2022

(30) Foreign Application Priority Data

Apr. 30, 2019 (KR) ........................ 10-2019-0050571
Apr. 22, 2020 (KR) ........................ 10-2020-0048708

(51) Int. Cl.
*B67D 1/08* (2006.01)
*B67D 1/00* (2006.01)

(52) U.S. Cl.
CPC ......... *B67D 1/0869* (2013.01); *B67D 1/0014* (2013.01)

(58) Field of Classification Search
None
See application file for complete search history.

(56) References Cited

U.S. PATENT DOCUMENTS 3,370,755 A * 2/1968 Querner ............... B67D 1/0057 222/146.6
4,742,939 A * 5/1988 Galockin ............. B67D 1/0074 366/137

(Continued)

FOREIGN PATENT DOCUMENTS

CN 103270380 A 8/2013
CN 107003057 A 8/2017

(Continued)

OTHER PUBLICATIONS

EP3203169 A1 English Machine Translation (Year: 2017).*

(Continued)

*Primary Examiner* — Jenna M Maroney
(74) *Attorney, Agent, or Firm* — Oblon, McClelland, Maier & Neustadt, L.L.P.

(57) ABSTRACT

A cold water production apparatus according to one embodiment of the present invention can include an apparatus body; a water tank which is provided in the apparatus body and which accommodates water flowing in from a water supply source; a cold water production pipe which is provided in the apparatus body so as to be connected to the water tank, and which allows the water accommodated in the water tank to flow thereto, move therein and then be discharged; and a cooling unit which is mounted on the outer surface of the apparatus body, and which cools the apparatus body so that the water accommodated in the water tank and the water flowing in the cold water production pipe is cooled.

14 Claims, 13 Drawing Sheets

(56) References Cited

U.S. PATENT DOCUMENTS

| | | | | | |
|---|---|---|---|---|---|
| 4,934,150 | A * | 6/1990 | Fessler | F25D 31/003 | 62/394 |
| 5,862,669 | A * | 1/1999 | Davis | H10N 10/00 | 62/208 |
| 6,019,254 | A * | 2/2000 | Kameyama | F28F 19/04 | 138/145 |
| 6,119,464 | A * | 9/2000 | Nakayama | F25D 21/02 | 62/139 |
| 6,122,928 | A | 9/2000 | Strobel et al. | | |
| 6,131,393 | A * | 10/2000 | Greene | B67D 3/0029 | 62/3.64 |
| 10,266,385 | B2 | 4/2019 | Lee et al. | | |
| 10,451,343 | B2 * | 10/2019 | Lee | F28D 20/02 | |
| 11,542,147 | B2 * | 1/2023 | Giardino | B67D 1/004 | |
| 2006/0112719 | A1 * | 6/2006 | Pfeifer | B67D 1/0862 | 62/389 |
| 2013/0062366 | A1 * | 3/2013 | Tansey | B67D 1/0809 | 222/101 |
| 2017/0362073 | A1 | 12/2017 | Lee et al. | | |
| 2018/0099854 | A1 | 4/2018 | Jung et al. | | |
| 2018/0105410 | A1 | 4/2018 | Kim et al. | | |
| 2018/0292119 | A1 | 10/2018 | Sung | | |
| 2020/0079639 | A1 | 3/2020 | Kim et al. | | |
| 2021/0380390 | A1 * | 12/2021 | Fantappie | F28D 7/10 | |
| 2022/0185649 | A1 * | 6/2022 | Heo | F25D 31/002 | |

FOREIGN PATENT DOCUMENTS

| | | | | |
|---|---|---|---|---|
| CN | 107917564 | A | 4/2018 | |
| DE | 20 2016 107 188 | U1 | 4/2017 | |
| EP | 1892214 | A1 * | 2/2008 | B01F 15/00162 |
| EP | 2 659 203 | A2 | 11/2013 | |
| EP | 3 141 849 | A1 | 3/2017 | |
| EP | 3203169 | B1 * | 4/2019 | F25D 16/00 |
| JP | H11100097 | A * | 4/1999 | |
| KR | 20-0308277 | Y1 | 3/2003 | |
| KR | 10-0836717 | B1 | 6/2008 | |
| KR | 10-2011-0083864 | A | 7/2011 | |
| KR | 10-2013-0035544 | A | 4/2013 | |
| KR | 20130035544 | A * | 4/2013 | |
| KR | 20130047391 | A * | 5/2013 | |
| KR | 10-2013-0140921 | A | 12/2013 | |
| KR | 10-2014-0052462 | A | 5/2014 | |
| KR | 10-2014-0090102 | A | 7/2014 | |
| KR | 10-2015-0127411 | A | 11/2015 | |
| KR | 10-1633687 | B1 | 6/2016 | |
| KR | 10-2017-0061301 | A | 6/2017 | |
| KR | 102145066 | B1 * | 8/2020 | |
| WO | WO 2016/017870 | A1 | 2/2016 | |
| WO | WO 2018/194339 | A1 | 10/2018 | |
| WO | WO-2019116822 | A1 * | 6/2019 | B67D 1/0884 |
| WO | WO-2019151650 | A1 * | 8/2019 | B67D 1/0801 |
| WO | WO-2019151652 | A1 * | 8/2019 | B67D 1/0014 |
| WO | WO-2020180064 | A1 * | 9/2020 | F25B 21/02 |
| WO | WO-2020222487 | A1 * | 11/2020 | B67D 1/0014 |

OTHER PUBLICATIONS

Shackelford, James F. Han, Young-Hwan Kim, Sukyoung Kwon, Se-Hun. (2015). CRC Materials Science and Engineering Handbook (4th Edition)—1.2 Chemical Properties. (pp. 100). Taylor & Francis. Table 1.32. Thermal Conductivity of Metals (Part 1). Retrieved from Knovel. (Year: 2015).*

KR200308277Y1 English Machine Translation (Year: 2003).*

International Search Report issued on Aug. 3, 2020 in PCT/KR2020/005546 filed on Apr. 28, 2020, 2 pages.

Extended European Search Report issued May 30, 2022 in European Patent Application No. 20798710.8, 9 pages.

Combined Chinese Office Action and Search Report issued Feb. 14, 2023 in Chinese Patent Application No. 202080032206.6 (with English Translation), 21 pages.

* cited by examiner

I-I'

II-II'

S300

S300

COLD WATER PRODUCTION APPARATUS AND METHOD

TECHNICAL FIELD

The present disclosure relates to a cold water generating apparatus for generating cold water and a method of manufacturing the same.

BACKGROUND ART

A cold water generating apparatus is an apparatus transforming water into cold water, and supplying the cold water to a user. Among such cold water manufacturing apparatuses, a method in which a heat transfer medium such as ice water is stored therein and a portion of a cold water pipe through which water flows is immersed in the heat transfer medium is also used.

Conventionally, in a cold water generating apparatus having such a configuration, a cooling unit cools a heat transfer medium and cools water flowing through a cold water pipe, transforms it into cold water, and supplies it to a user. As described above, in the conventional cold water generating apparatus, cooling efficiency of the cold water generating apparatus may be inefficient because the water flowing through the cold water pipe is indirectly cooled by the heat transfer medium instead of being directly cooled by the cooling unit.

In addition, in order to cool a larger amount of water, an amount of heat transfer medium is increased and a length of the cold water pipe immersed in the heat transfer medium must be increased.

Meanwhile, in order to reduce a size of the cold water generating apparatus, a method of using a thermoelectric element, rather than ice water, as a cold water generating apparatus, has been proposed. European Patent Publication No. EP2659203 "Cold water Tank and Water Treatment Apparatus Having the Same" of the present applicant discloses a cold water generating apparatus using a thermoelectric element.

According to this method, since the thermoelectric element in thermal contact with the tank cools water stored in the tank, the size of the cold water generating apparatus can be reduced. However, since it is necessary to cool a large amount of water stored in the tank, it is difficult to cool water located distantly from a surface of the tank, so the cooling efficiency is lowered, and there may be a problem that the time for which the cold water remains in the tank is relatively long.

DISCLOSURE

Technical Problem

The present disclosure has been made in recognition of at least one of the needs or problems occurring in the prior art as described above.

An aspect of the present disclosure is to provide a cold water generating apparatus and a method of manufacturing the same, wherein in the cold water generating apparatus, cold water generation efficiency is improved while the size of the cold water generating apparatus is reduced.

Technical Solution

A cold water generating apparatus related to an embodiment for realizing at least one of the above problems may include the following features.

A cold water generating apparatus, includes: an apparatus body; a water tank which is provided in the apparatus body and which accommodates water flowing in from a water supply source; a cold water generation pipe which is provided in the apparatus body so as to be connected to the water tank, and which allows the water accommodated in the water tank to flow thereto, to then be discharged; and a cooling unit which is mounted on an outer surface of the apparatus body, and which cools the apparatus body so that the water accommodated in the water tank and the water flowing in the cold water generation pipe is cooled, wherein the apparatus body has a tank insertion space having one open side so that at least a portion of the water tank is inserted thereinto, wherein the water tank includes a tank main body which is inserted into the tank insertion space and having one open side, and a tank cover which is coupled to the apparatus body so as to cover the one open side of the tank main body, and having an inlet which allows water from the water supply source to flow into the tank main body and a connector connected to the cold water generation pipe, wherein the apparatus body and the water tank include a material having thermal conductivity of 10 W (m·K) or higher at room temperature.

In addition, the apparatus body and the cold water generation pipe may be made of metal, and the apparatus body and the cold water generation pipe may be integrally formed by die casting.

In addition, the cold water generation pipe may be disposed on the apparatus body to surround the tank insertion space.

The cold water generation pipe may be formed to have a spiral shape on a side surface of the apparatus body so as to surround the tank insertion space of the apparatus body.

In addition, the cooling unit may include a thermoelectric module installed so that a cooling side thereof is in contact with a cold sink unit formed on the apparatus body.

The cooling unit may further include a heat transfer member connected to be in contact with a heating side of the thermoelectric module, a heating pipe having one side thereof connected to the heat transfer member, a heat sink in which the other side of the heating pipe is connected, and a blowing fan provided in the heat sink.

In addition, the cold water generating apparatus according to an embodiment of the present disclosure may further include a heat insulating member surrounding the apparatus body and the tank cover.

A method of manufacturing a cold water generating apparatus includes: an operation of preparing a cold water generation pipe; an operation of integrally forming the cold water generation pipe inside side parts of an apparatus body having a tank insertion space having one open side and a cold sink unit on a side surface, by performing die casting, wherein the cold water generation pipe is configured to surround the tank insertion space; and an operation of installing of inserting and installing a water tank into the tank insertion space, and connecting and installing a cooling unit to the cold sink unit, wherein the apparatus body and the water tank are formed of a material having thermal conductivity of 10 W/(m·K) or more at room temperature, wherein in the installation operation, a tank main body included in the water tank is inserted into the tank insertion space, and a tank cover having an inlet and a connector is connected to the apparatus body so as to cover one open side of the tank main body.

In this case, the apparatus body and the cold water generation pipe may be made of metal.

In addition, the cold water generation pipe may have a spiral shape.

In the installation operation, it is possible to connect the connector and one side of the cold water generation pipe.

In addition, in the installation operation, after inserting the tank main body into the tank insertion space, a heat insulating body unit included in the heat insulating member is provided to surround a portion of the apparatus body, and after the connector and one side of the cold water generation pipe are connected, a heat insulating cover unit is provided to surround a rest of the apparatus body and the tank cover.

The cooling unit may include a thermoelectric module installed so that a cooling side thereof is in contact with the cold sink unit.

In addition, the cooling unit may further include a heat transfer member connected to be in contact with a heating side of the thermoelectric module, a heating pipe having one side thereof connected to the heat transfer member, a heat sink in which the other side of the heating pipe is connected, and a blowing fan provided in the heat sink.

Advantageous Effects

According to an embodiment of the present disclosure, it is possible to obtain an effect that cold water generation efficiency is improved while the size of the cold water generating apparatus is reduced.

BEST MODE FOR INVENTION

Figure 1:
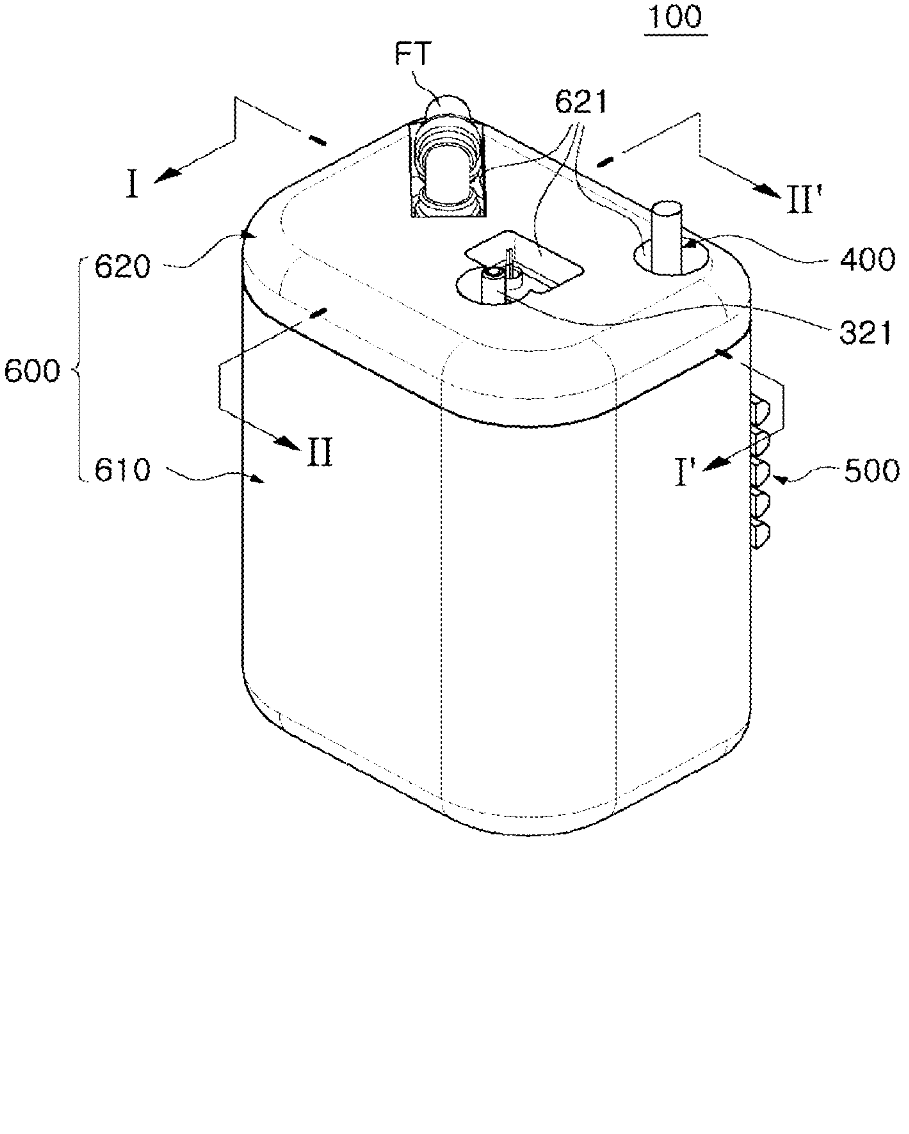
FIG. 1 is a front perspective view of an embodiment of a cold water generating apparatus according to the present disclosure.

In order to help the understanding of the features of the present disclosure as described above, a cold water generating apparatus and a method for manufacturing the same related to an embodiment of the present disclosure will be described in more detail below.

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art. In the drawings, the same reference numerals will be used throughout to designate the same or like elements, and the shapes and dimensions of elements may be exaggerated for clarity. In addition, the same reference numerals will be used throughout the drawings for elements having the same or similar functions and operations.

Hereinafter, embodiments of the present disclosure will be described with reference to the drawings.

Cold Water Generating Apparatus

Hereinafter, an embodiment of a cold water generating apparatus according to the present disclosure will be described with reference to FIGS. 1 to 6.

Figure 2:
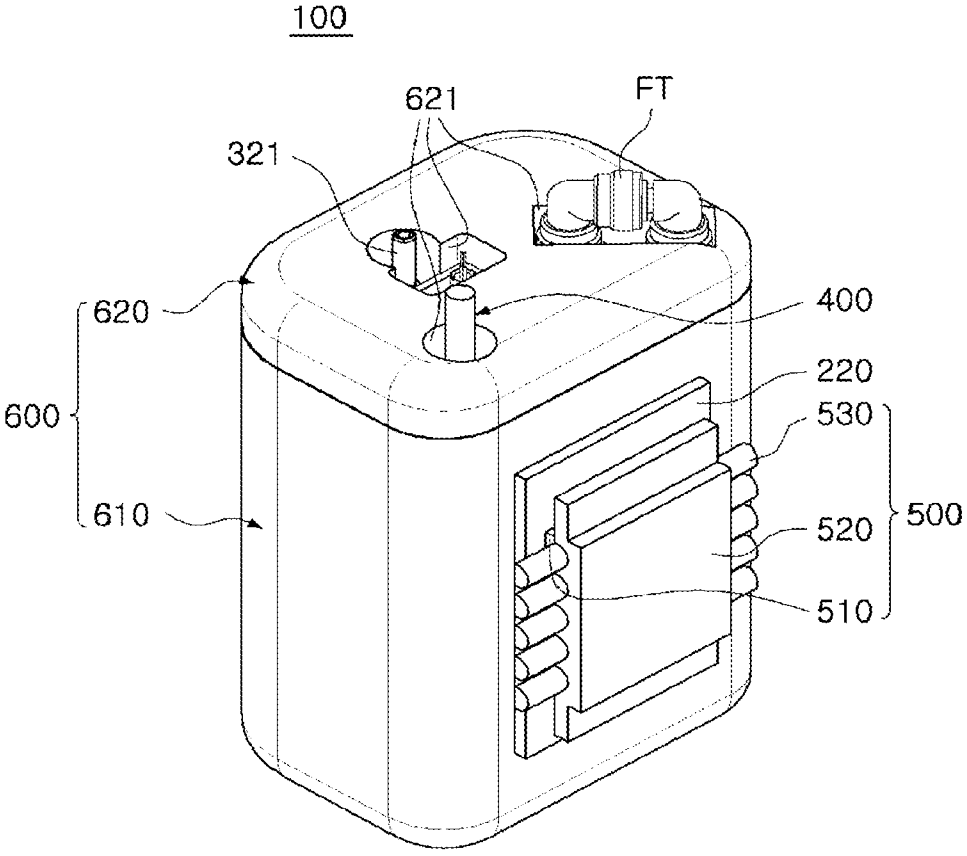
FIG. 2 is a rear perspective view of an embodiment of the cold water generating apparatus according to the present disclosure.

FIG. 1 is a front perspective view of an embodiment of a cold water generating apparatus according to the present disclosure, and FIG. 2 is a rear perspective view of an embodiment of a cold water generating apparatus according to the present disclosure.

Figure 3:
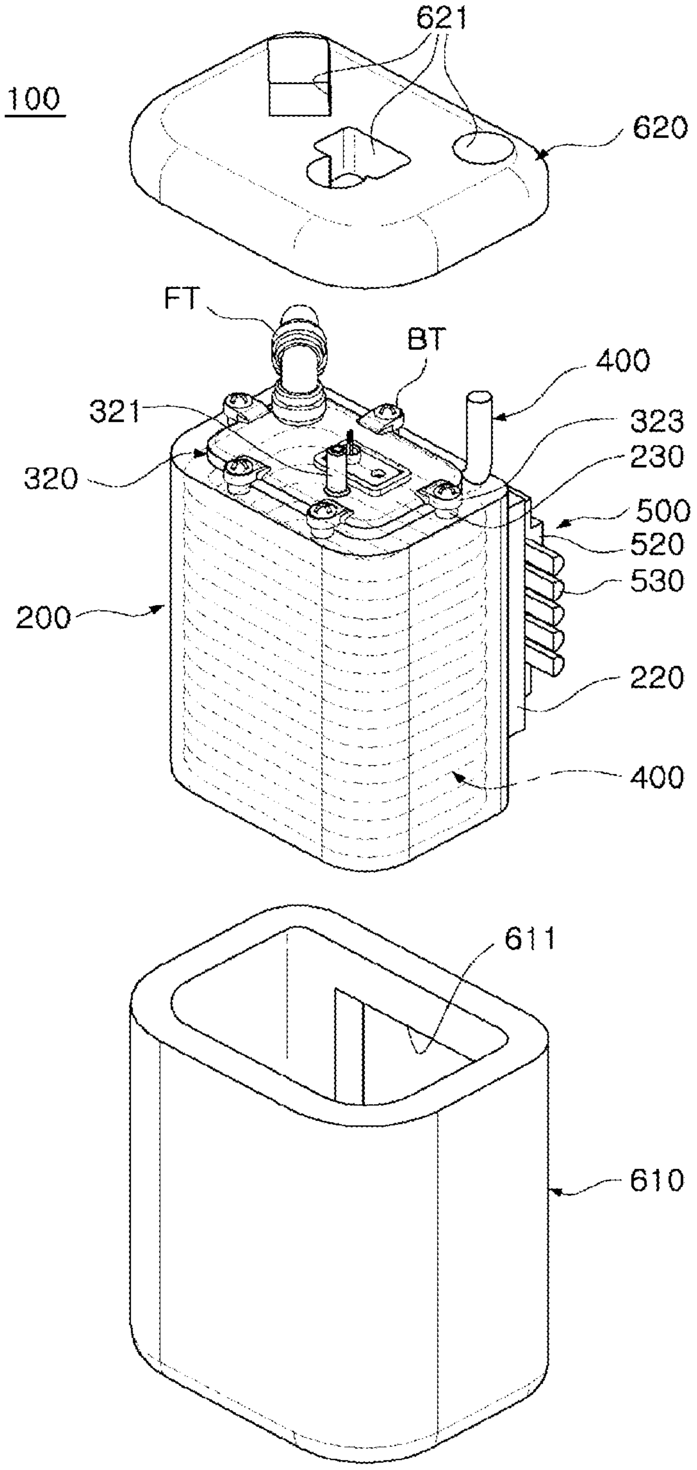
FIG. 3 is a perspective view illustrating the separation of the heat insulating member in an embodiment of the cold water generating apparatus according to the present disclosure.
Figure 4:
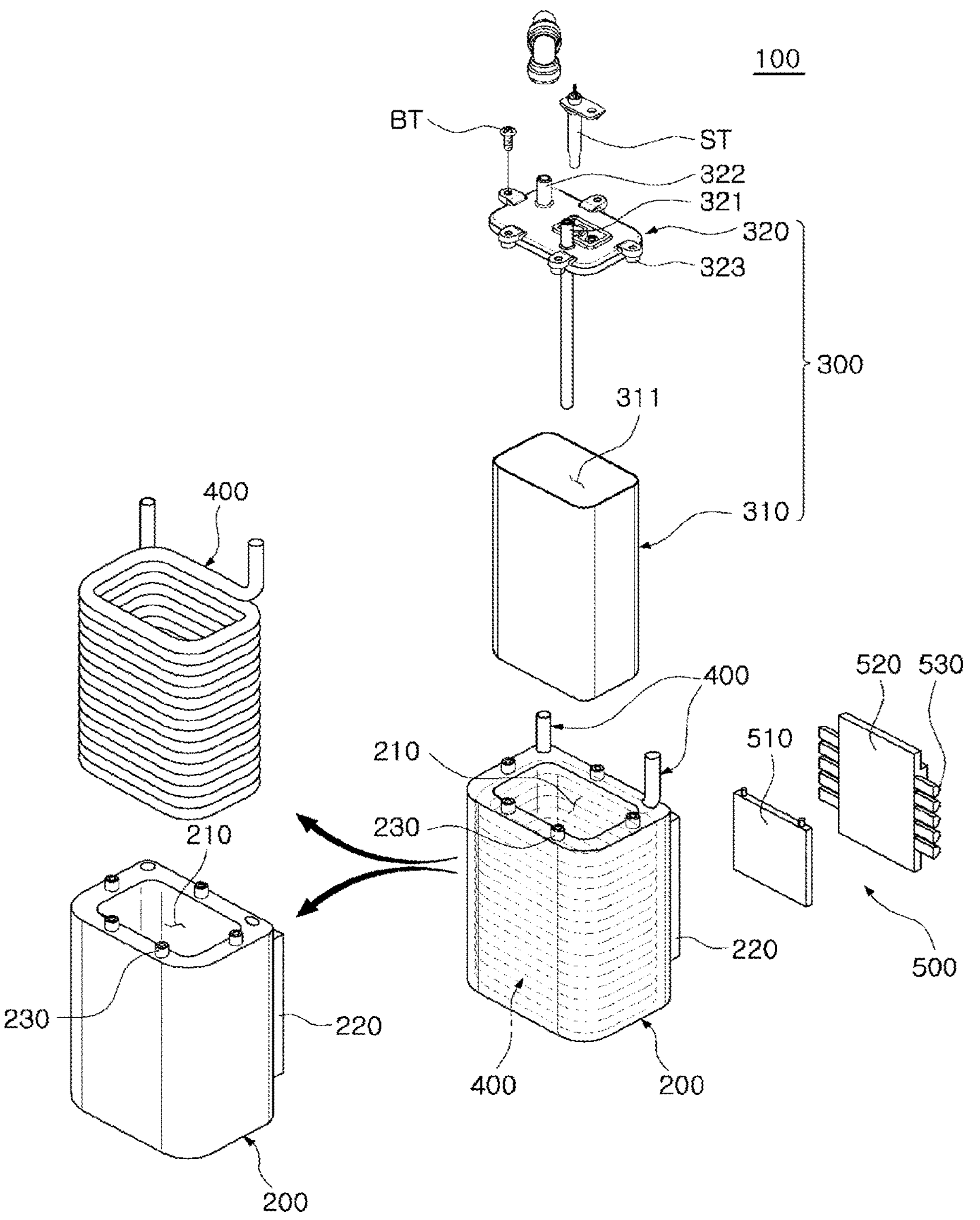
FIG. 4 is an exploded perspective view of an embodiment of the cold water generating apparatus according to the present disclosure except for a heat insulating member.

In addition, FIG. 3 is a perspective view illustrating separation of a heat insulating member in an embodiment of the cold water generating apparatus according to the present disclosure, and FIG. 4 is an exploded perspective view of an embodiment of the cold water generating apparatus according to the present disclosure except for the heat insulating member.

Figure 5:
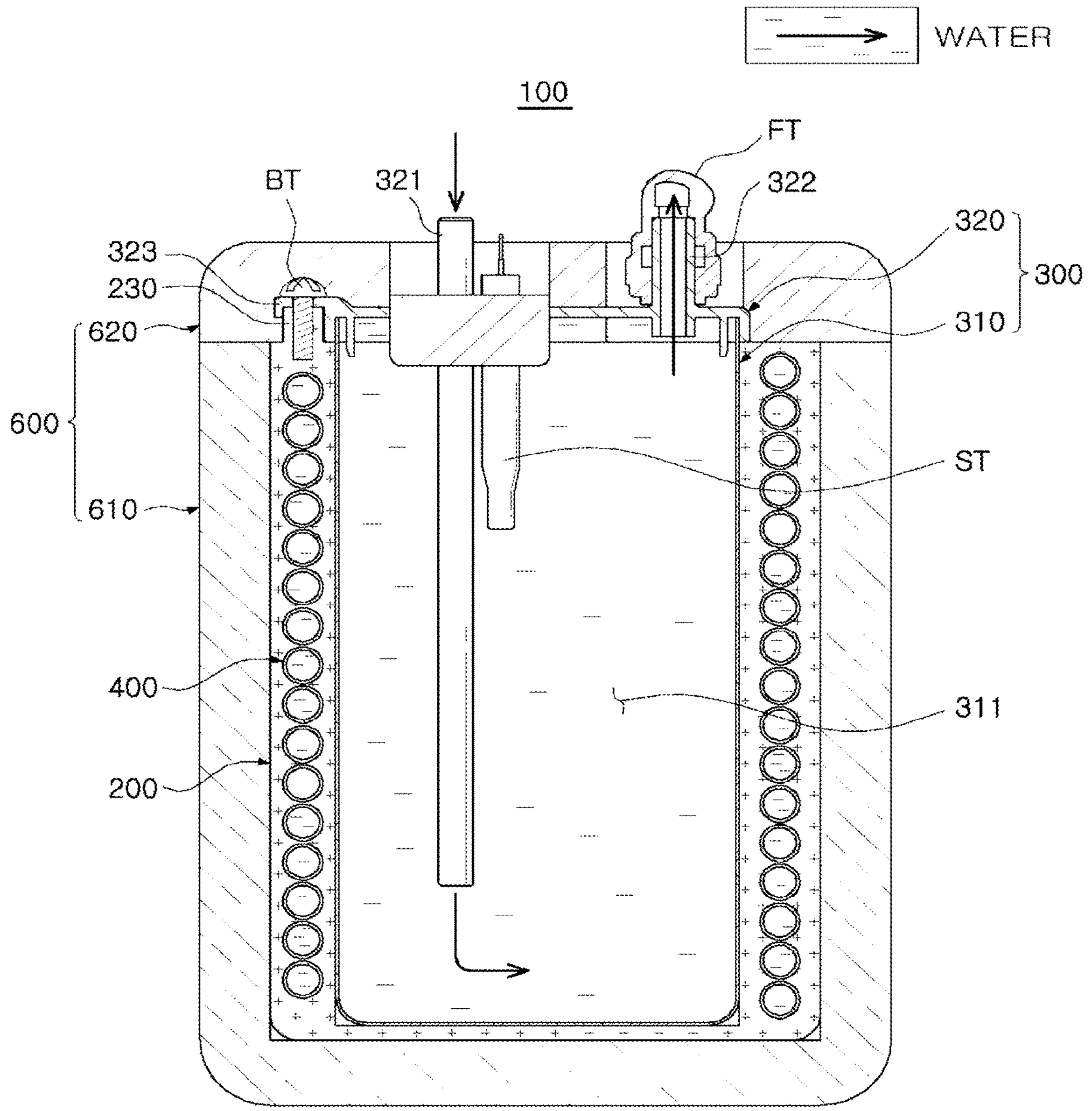
FIGS. 5 and 6 are views illustrating an operation of an embodiment of the cold water generating apparatus according to the present disclosure, and are cross-sectional views taken along lines I-I' and II-II' of FIG. 1, respectively.
Figure 6:
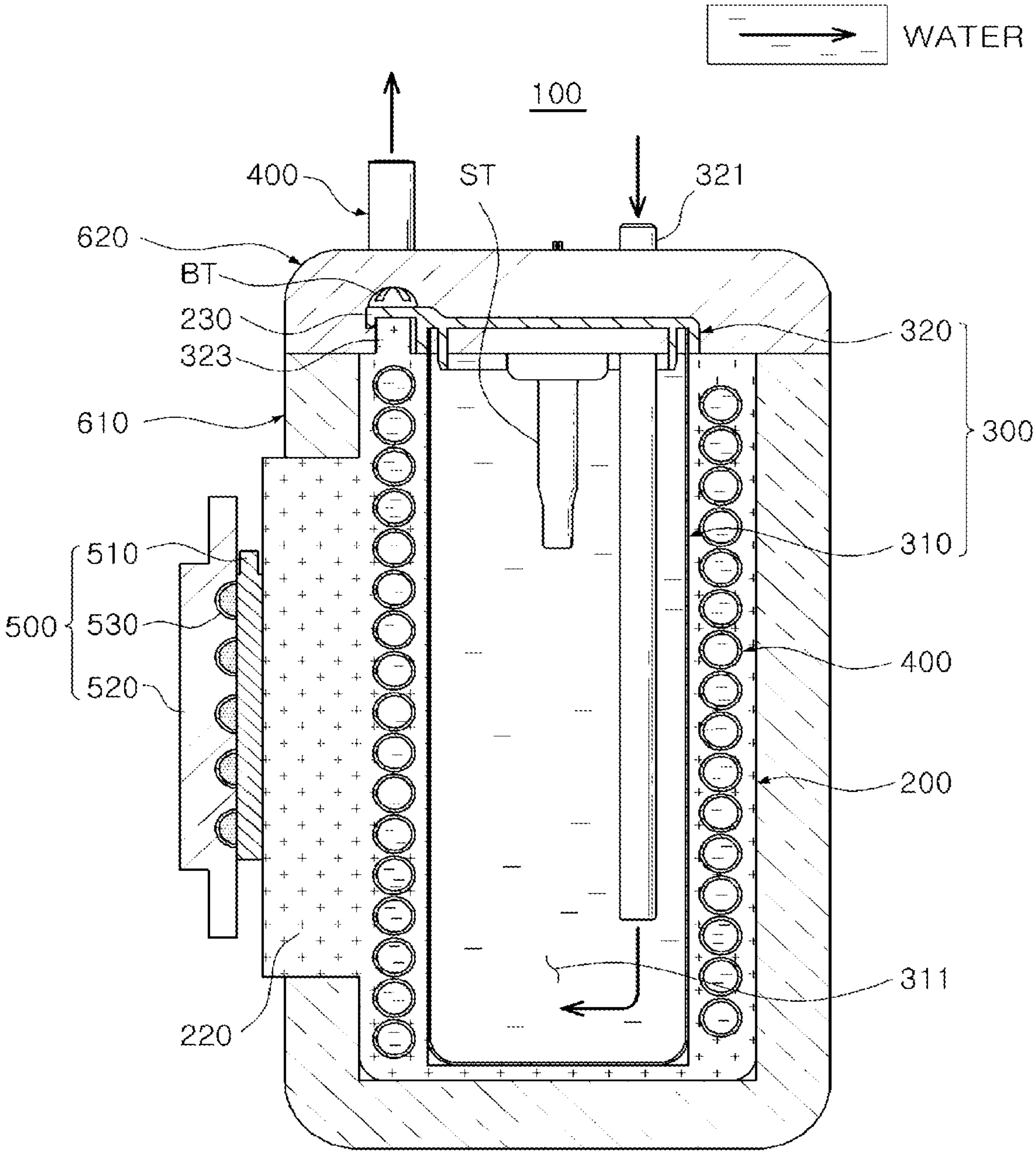

FIGS. 5 and 6 are views illustrating an operation of an embodiment of the cold water generating apparatus according to the present disclosure, and are cross-sectional views taken along lines I-I' and II-II' of FIG. 1, respectively.

An embodiment of a cold water generating apparatus 100 according to the present disclosure may include an apparatus body 200, a water tank 300, a cold water generation pipe 400, and a cooling unit 500.

As shown in FIG. 4, a tank insertion space 210 having one open side may be formed in the apparatus body 200. At least a portion of the water tank 300, for example, the tank main body 310 of the water tank 300 may be inserted into the tank insertion space 210 through the one open side of the tank insertion space 210. Accordingly, when the apparatus body 200 may be cooled by the cooling unit 500, the water in the water tank 300 may be cooled.

A cold sink unit 220 may be formed in the apparatus body 200 as shown in FIGS. 2 to 4 and 6. The cooling unit 500 may be connected to the cold sink unit 220. Accordingly, when the cooling unit 500 cools the cold sink unit 220, the apparatus body 200 may be cooled. For example, the cold sink unit 220 may be installed so that a cooling side of the thermoelectric module 510 included in the cooling unit 500 is in contact. When electricity is applied to the thermoelectric module 510, the cold sink unit 220 may be cooled to cool the apparatus body 200. In addition, the cooling unit 500 may include an evaporation tube (not shown) through which a refrigerant flows. In this case, the evaporation tube may be provided on the apparatus body 200 to surround the apparatus body 200, or may be configured to be integrally formed with the apparatus body 200 to cool the apparatus body 200.

The apparatus body 200 may be made of a material having high thermal conductivity, such as metal. For example, such a material may be exemplified by aluminum, gold, copper, silver, graphene, or the like having thermal conductivity of 10 W/(m·K) or more at room temperature. As described above, when the apparatus body 200 is made of a material having high thermal conductivity, cooling of the apparatus body 200 by the cooling unit 500 can be made faster. In addition, as will be described later, the apparatus body 200 may be integrally formed with the cold water generation pipe 400 made of metal by die casting.

The water tank 300 may be provided in the apparatus body 200. As described above, a tank insertion space 210 having one open side may be formed in the apparatus body 200, and at least a portion of the water tank 300 may be inserted into the tank insertion space 210 through the open side of the tank insertion space 210, such that the water tank 300 may be provided in the apparatus body 200. Accordingly, in an embodiment of the cold water generating apparatus 100 according to the present disclosure, a size thereof may be reduced. However, the configuration in which the water tank 300 is provided in the apparatus body 200 is not particularly limited, and any known configuration is possible.

The water tank 300 may be connected to a water supply source (not shown) such as water supply, or the like. Accordingly, water from the water supply source may be introduced into and accommodated in the water tank 300 as shown in FIGS. 5 and 6. For example, as shown in FIGS. 3 to 6, the water tank 300 may include an inlet 321 connected to a water supply source by a connecting pipe (not shown). In addition, water from the water supply source may flow to the inlet 321 through the connection pipe and may be introduced into the water tank 300 through the inlet 321.

The water tank 300 may be made of a material having high thermal conductivity, such as metal. For example, such a material may include aluminum, gold, copper, silver, graphene, or the like having a thermal conductivity of 10 W/(m·K) or more at room temperature. However, since water is accommodated in the water tank 300, it is preferable to use, for example, stainless steel in consideration of the lack of corrosiveness thereof.

The water tank 300 may include a tank main body 310 and a tank cover 320 as shown in FIGS. 4 to 6.

The tank main body 310 may be inserted into the tank insertion space 210 through one open side of the tank insertion space 210 of the apparatus body 200. A storage space 311 may be formed inside the tank main body 310. Water from the water supply source may be introduced into the storage space 311 of the tank main body 310 through the inlet 321.

The tank cover 320 may be connected to the apparatus body 200 so as to cover one open side of the tank main body 310, for example, one open side of the storage space 311 of the tank main body 310. For example, a cover connecting unit 230 may be formed in the apparatus body 200 as shown in FIGS. 3 and 4. In addition, a body connecting unit 323 connected to the cover connecting unit 230 may be formed in the tank cover 320. As shown in FIGS. 5 and 6, in a state in which the body connecting unit 323 of the tank cover 320 is located in the cover connecting unit 230, the body connecting unit 323 and the cover connecting unit 230 may be connected by a bolt BT, to be connected to the apparatus body 200 such that the tank cover 320 covers the open side of the tank main body 310. However, the configuration in which the tank cover 320 is connected to the apparatus body 200 so as to cover the one open side of the tank main body 310 is not particularly limited, and any known configuration is possible.

The tank cover 320 may be provided with an inlet 321 and a connector 322 as shown in FIG. 4. The inlet 321 may be connected to a water supply source such as water supply, or the like, by a connection pipe. Accordingly, water of the water supply source may flow through the connection pipe, and as shown in FIGS. 5 and 6, the water may be introduced into the storage space 311 of the tank main body 310 through the inlet 321. The connector 322 may be connected to the cold water generation pipe 400. Accordingly, water in the storage space 311 of the tank main body 310 may be introduced into the cold water generation pipe 400 through the connector 322. The connector 322 may be connected to the cold water generation pipe 400 by, for example, a fitting member FT. However, the configuration in which the connector 322 is connected to the cold water generation pipe 400 is not particularly limited, and any known configuration is possible.

As shown in FIG. 4, the tank cover 320 may be provided with a temperature sensor ST capable of measuring a temperature of water in the storage space 311 of the tank main body 310.

The cold water generation pipe 400 may be provided in the apparatus body 200 to be connected to the water tank 300. As shown in FIGS. 5 and 6, the water accommodated in the water tank 300 may flow into the cold water generation pipe 400 to then be discharged.

The cold water generation pipe 400 may be formed integrally with the apparatus body 200. Accordingly, in an embodiment of the cold water generating apparatus 100 according to the present disclosure, a size thereof may be reduced. For example, the cold water generation pipe 400 and the apparatus body 200 may be made of metal, and the cold water generation pipe 400 may be integrally formed with the apparatus body 200 by die casting.

The cold water generation pipe 400 may be made of, for example, stainless steel. However, the metal constituting the cold water generation pipe 400 is not particularly limited, and any metal may be used as long as it can be formed integrally with the apparatus body 200 by die casting.

In this case, as shown in FIGS. 5 and 6, the cold water generation pipe 400 may be disposed in the apparatus body 200 to surround the tank insertion space 210 of the apparatus body 200. Accordingly, when the apparatus body 200 is cooled by the cooling unit 500 and the water flowing through the cold water generation pipe 400 is cooled, the apparatus body 200 is cooled by the water flowing through the cold water generation pipe 400. Water in the water tank 300 inserted into the tank insertion space 210 may be cooled. Accordingly, the water in the water tank 300 may be cooled not only by cooling the apparatus body 200 with the cooling unit 500, but also with the water flowing through the cold water generation pipe 400. Accordingly, in an embodiment of the cold water generating apparatus 100 according to the present disclosure, cold water generation efficiency can be improved. The cold water generation pipe 400 may be formed to have a spiral shape on a side surface of the apparatus body 200 so as to surround the tank insertion space 210 of the apparatus body 200 as shown in FIG. 4. Accordingly, a heat transfer area between the cold water generation pipe 400 and the apparatus body 200 may be increased, and heat transfer between the water flowing through the cold water generation pipe 400 and the water in the water tank 300 may be smoothly performed. Therefore, cooling of the water flowing through the cold water generation pipe 400 by cooling the apparatus body 200 of the cooling unit 500 and cooling of the water in the water tank 300 by the water flowing through the cold water generation pipe 400 may be done faster. Also thereby, in an embodiment of the cold water generating apparatus 100 according to the present disclosure, the cold water generation efficiency can be improved.

The cooling unit 500 may be provided in the apparatus body 200 to cool the apparatus body 200. As described above, as the apparatus body 200 is cooled by the cooling unit 500, the water accommodated in the water tank 300 and the water in the cold water generation pipe 400 may be cooled. Accordingly, the water from a water supply source may be primarily cooled in the water tank 300 and the primarily-cooled water may be cooled secondarily in the cold water generation pipe 400 during a water outflow process to become cold water below a predetermined temperature. As described above, since the water of the water supply source is cooled primarily in the water tank 300 and secondarily cooled in the cold water generation pipe 400, in an embodiment of the cold water generating apparatus 100 according to the present disclosure, not only a size thereof may be reduced, but also the cold water generation efficiency may be improved.

The cooling unit 500 may further include a heat transfer member 520, a heating pipe 530, a heat sink (not shown), and a blowing fan (not shown). The heat transfer member 520 may be connected to be in contact with a heating side of the thermoelectric module 510. In addition, one side of the heating pipe 530 may be connected to the heat transfer member 520. In addition, the other side of the heating pipe 530 may be connected to the heat sink. In addition, the blowing fan may be provided in the heat sink. Accordingly, heat generated from the heating surface of the thermoelectric module 510 may be transferred to the heat sink through the heat transfer member 520 and the heating pipe 530 to be dissipated by the heat sink and the blowing fan. In addition, since the heat sink provided with the blowing fan does not directly contact the heating surface of the thermoelectric module 510, but is connected to the heating side of the thermoelectric module 510 through the heating pipe 530, a degree of freedom of installation can be increased.

A configuration of the cooling unit 500 is not particularly limited, and as long as the configuration is a configuration that can be provided in the apparatus body 200 such as including an evaporation tube through which a refrigerant flows so that the water in the water tank 300 and the water flowing through the cold water generation pipe 400 are cooled by cooling the apparatus body 200, any well-known configuration is possible.

In an embodiment of the cold water generating apparatus 100 according to the present disclosure, a heat insulating member 600 may further be included. As shown in FIGS. 1 and 2 and 5 and 6, the heat insulating member 600 may be configured to surround the apparatus body 200, a tank cover 320 of the water tank 300. Thereby, it is possible to prevent external heat from being transmitted to the water flowing through the water tank 300 and the cold water generation pipe 400 through the apparatus body 200 and the tank cover 320 of the water tank 300.

As shown in FIGS. 1 to 3 and 5 and 6, the heat insulating member 600 may include a heat insulating body unit 610 and a heat insulating cover unit 620. The heat insulating body unit 610 may be configured to surround the apparatus body 200. The heat insulating cover unit 620 may be connected to the heat insulating body unit 610 to surround the tank cover 320 of the water tank 300.

As shown in FIG. 3, a sink exposing hole 611 may be formed in the heat insulating body unit 610. As shown in FIG. 2 through the sink exposing hole 611, the cold sink unit 220 of the apparatus 200 may be exposed externally so that the cooling unit 500 may be provided in the cold sink unit 220 of the apparatus body 200.

As shown in FIG. 3, a member exposing hole 621 may be formed in the heat insulating cover unit 620. Through the member exposing hole 621, as shown in FIGS. 1 and 2, an inlet 321 of the tank cover 320 of the water tank 300, a fitting member FT connecting a connector 322 of the tank cover 320 of the water tank 300 and one side of the cold water generation pipe 400, or the other side of the cold water generation pipe 400 may be exposed externally.

Method for Manufacturing a Cooling Generating Apparatus

Hereinafter, an embodiment of a method for manufacturing a cold water generating apparatus according to the present disclosure will be described with reference to FIGS. 7 to 13.

FIGS. 7 to 13 are views illustrating an embodiment of a method of manufacturing a cold water generating apparatus according to the present disclosure.

An embodiment of the method of manufacturing a cold water generating apparatus according to the present disclosure may include a preparation operation (S100), a body forming operation (S200), and an installation operation (S300).

Figure 7:
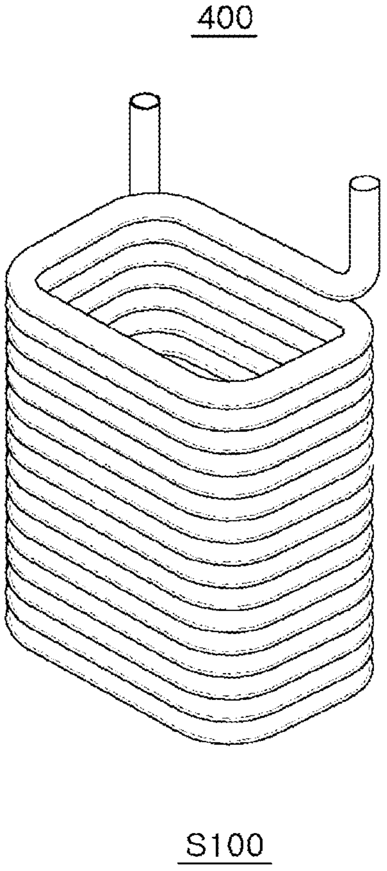
FIGS. 7 to 13 are views illustrating an embodiment of a method for manufacturing a cold water generating apparatus according to the present disclosure.

In the preparation operation (S100), a cold water generation pipe 400 as shown in FIG. 7 may be prepared. For example, the cold water generation pipe 400 may be formed by bending a pipe generated by extrusion, drawing, or the like, into a predetermined shape. However, a method and configuration of making and then preparing the cold water generation pipe 400 is not particularly limited, and any known method and configuration may be used.

Figure 8:
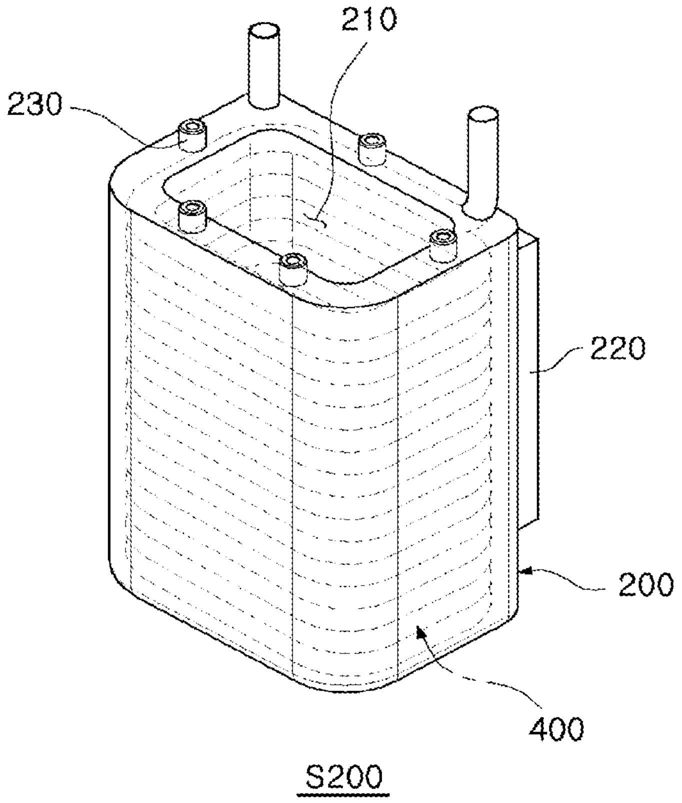

In the body formation operation (S200), as shown in FIG. 8, the apparatus body 200 in which the tank insertion space 210 and the cold sink unit 220 are formed can be made integrally with the cold water generation pipe 400. The apparatus body 200 and the cold water generation pipe 400 may be made of a material having thermal conductivity of 10 W/(m·K) or more at room temperature, and may be made of, for example, metal. In the body formation operation (S200), the apparatus body 200 can be made to be integrated with the cold water generation pipe 400 by die casting. For example, the apparatus body 200 may be made of aluminum, and the cold water generation pipe 400 may be made of stainless steel. By aluminum die casting with a mold (not shown) capable of making the apparatus body 200 in which the tank insertion space 210 and the cold sink unit 220 are formed, the apparatus body 200 may be made to be integrated with the cold water generation pipe 400.

In the body formation operation (S200), the cold water generation pipe 400 may surround the tank insertion space 210. For example, in a state in which the cold water generation pipe 400 surrounds a portion of the mold that becomes the tank insertion space 210 of the apparatus body 200, by aluminum die casting, the cold water introduction pipe 400 may surround the tank insertion space 210. In this case, the cold water introduction pipe 400 may have, for example, a spiral shape. However, the shape of the cold water introduction pipe 400 is not particularly limited, and any shape is possible as long as it can surround the tank insertion space 210.

In the installation operation (S300), the water tank 300 may be inserted into the tank insertion space 210 and the cooling unit 500 connected to the cold sink unit 220.

Figure 9:
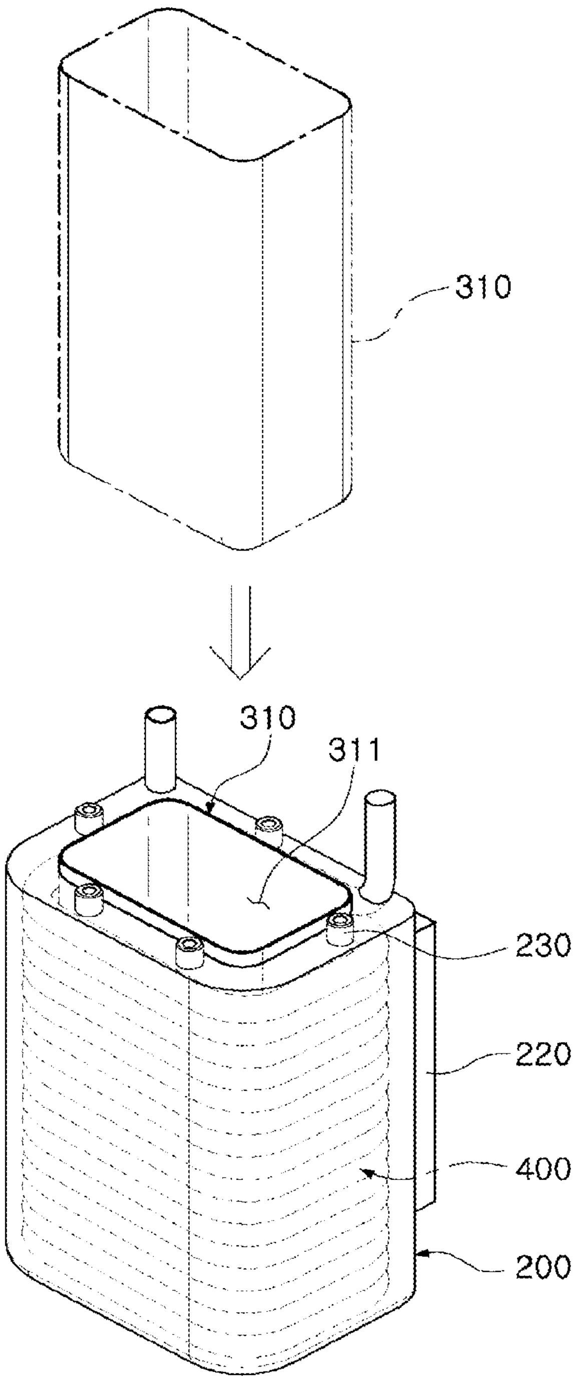
Figure 12:
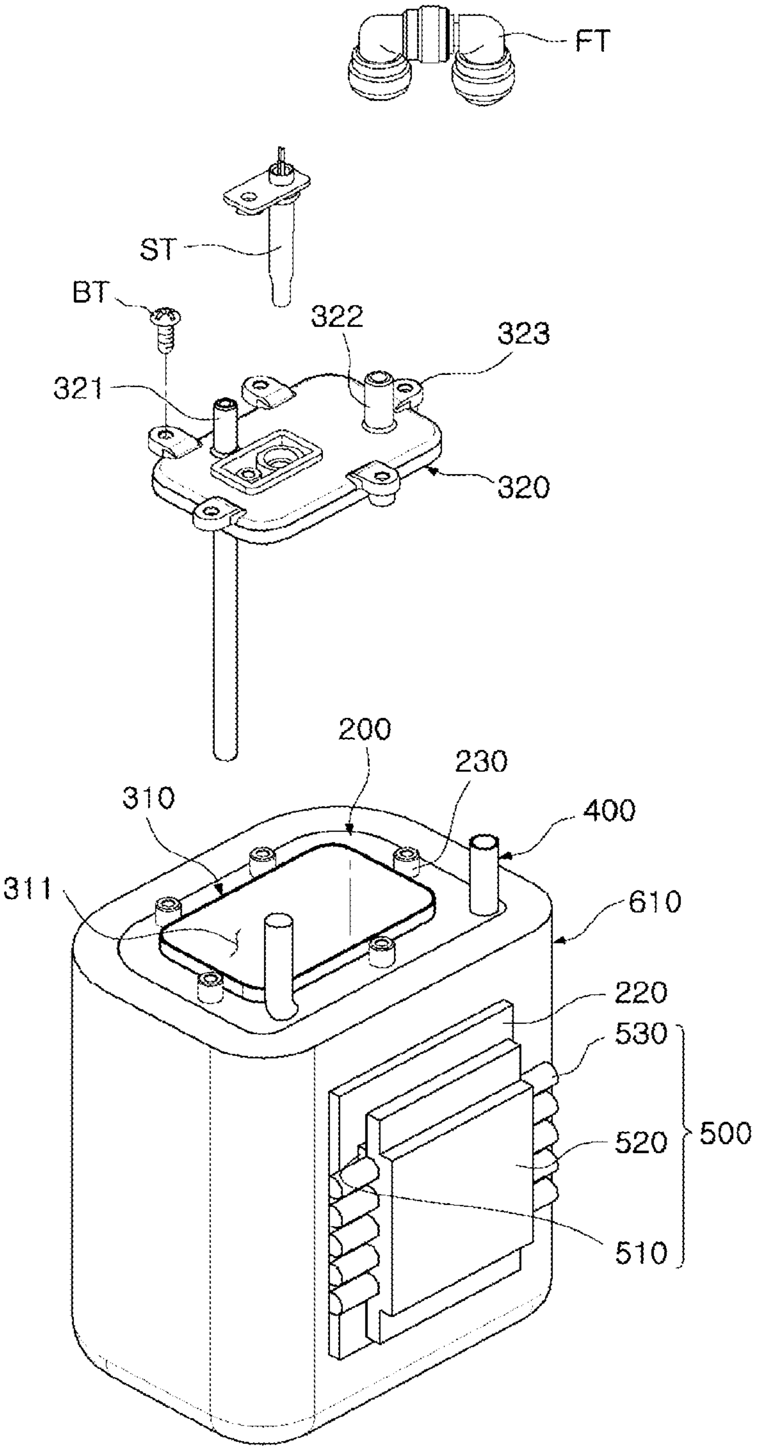

In the installation operation (S300), as shown in FIG. 9, the tank main body 310 of the water tank 300 may be inserted into the tank insertion space 210, and as shown in FIG. 12, the tank cover 320 of the water tank 300 may be connected to the apparatus body 200 to cover one open side of the tank main body 310.

In the installation operation (S300), as shown in FIG. 12, a connector 322 of a tank cover 320 and one side of the cold water generation pipe 400 may be connected. For example, by a fitting member FT, the connector 322 of the tank cover 320 and one side of the cold water generation pipe 400 may be connected.

Figure 10:
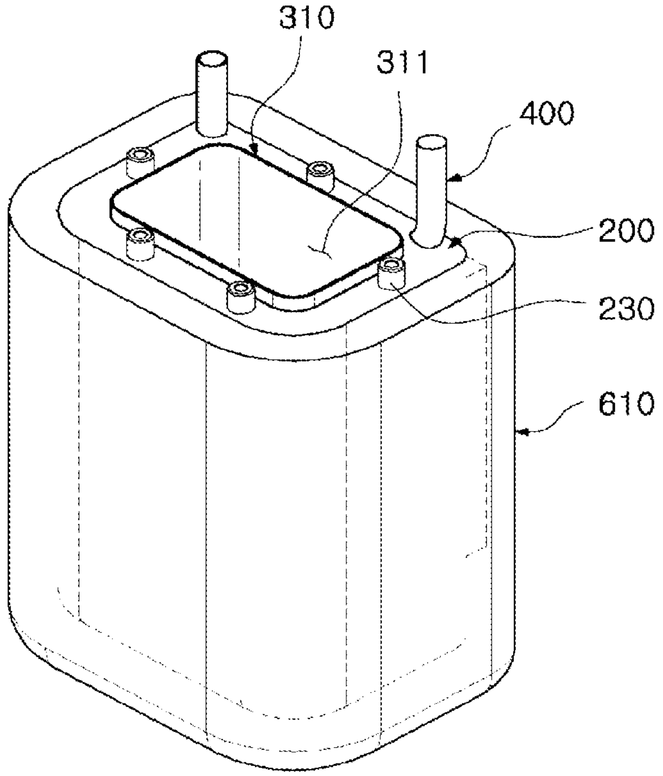
Figure 11:
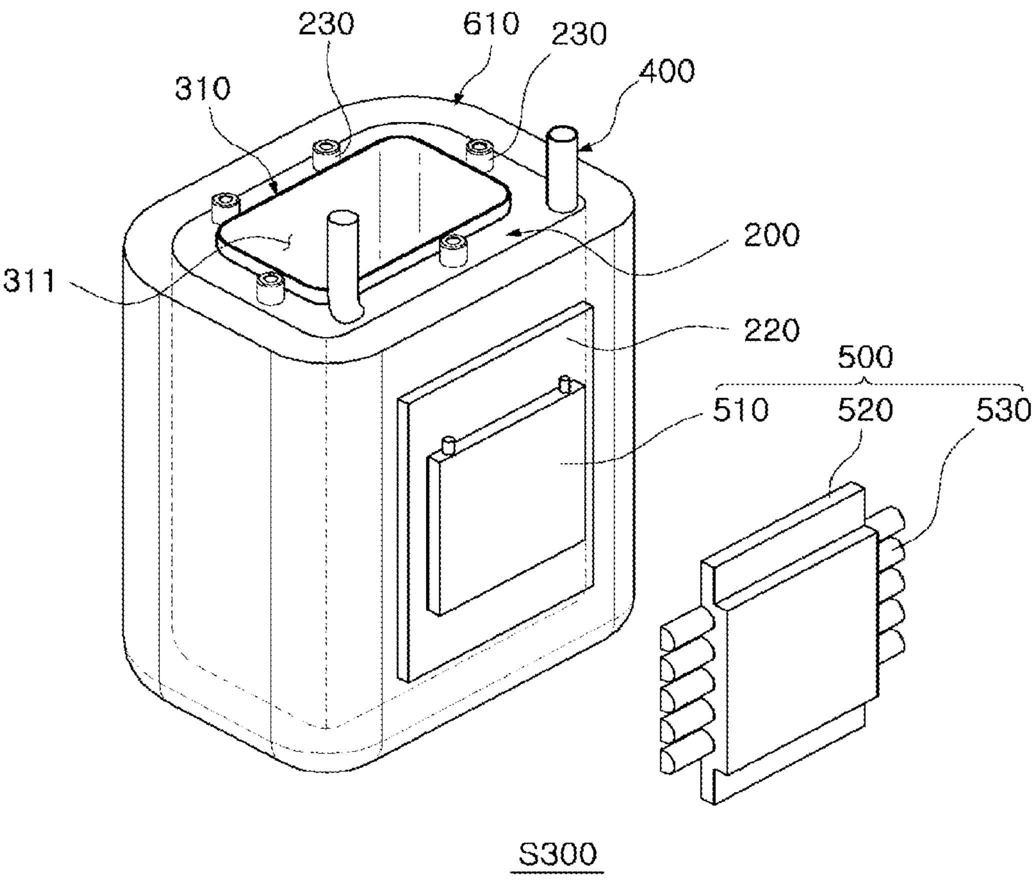
Figure 13:
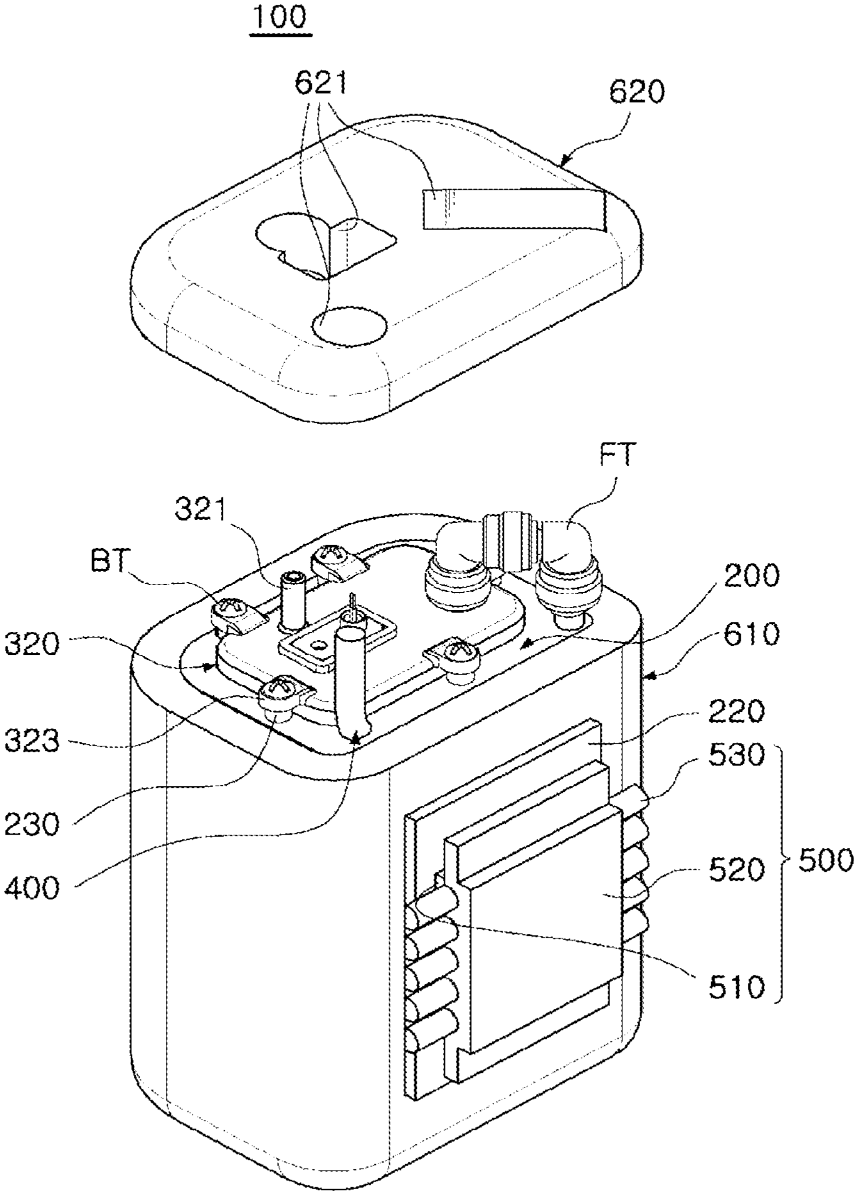

In the installation operation (S300), as shown in FIG. 10, after inserting the tank main body 310 of the water tank 300 into the tank insertion space 210 of the apparatus body 200, a heat insulating body 610 of a heat insulating member 600 may surround a portion of the apparatus body 200. In this case, the cold sink unit 220 of the apparatus body 200 may be exposed through a sink exposing hole 611 of the heat insulating body 610. In the installation step (S300), as shown in FIG. 13, after the connector 322 of the tank cover 320 and one side of the cold water generation pipe 400 are connected, the heat insulating cover unit 620 of the heat insulating member 600 may be configured to surround a rest of the apparatus body 200 and the tank cover 320 of the water tank 300. In this case, an inlet 321 of the tank cover 320 of the water tank 300, a fitting member FT connecting the connector 322 of the tank cover 320 of the water tank 300 and one side of the cold water generation pipe 400, the other side of the cold water generation pipe, or the like may be exposed through the member exposing hole 621 of the heat insulating cover unit 620.

The cooling unit 500 may include a thermoelectric module 510. The thermoelectric module 510 may be installed so that a cooling surface thereof is in contact with the cold sink unit 220 of the apparatus body 200.

The cooling unit 500 may further include a heat transfer member 520, a heating pipe 530, a heat sink, and a blowing fan. The heat transfer member 520 may be connected to be in contact with a heating side of the thermoelectric module 510. In addition, one side of the heating pipe 530 may be connected to the heat transfer member 520. In addition, the other side of the heating pipe 530 may be connected to the heat sink. In addition, the blowing fan may be provided in the heat sink.

The configuration of the cooling unit 500 is not particularly limited, and as long as it is provided in the apparatus body 200 to cool the apparatus body 200, such as including an evaporation tube through which refrigerant flows, and any known configuration is possible.

As described above, by using the cold water generating apparatus and a method of manufacturing the same according to the present disclosure, a size of the cold water generating apparatus may be reduced, and cold water generation efficiency of the cold water generating apparatus may be improved.

The cold water generating apparatus and a method of manufacturing the same are not limited to the configuration of the above-described embodiment, but the above embodiments may be configured by selectively combining all or part of each of the embodiments so that various modifications can be made.

While exemplary embodiments have been shown and described above, it will be apparent to those skilled in the art that modifications and variations could be made without departing from the scope of the present invention, as defined by the appended claims.

DESCRIPTION OF REFERENCE NUMERALS

100: cold water generating apparatus
200: apparatus body
210: tank insertion space
220: cold sink unit
230: cover connecting unit
300: water tank
310: tank main body
311: storage space
320: tank cover
321: inlet
322: connector
323: body connecting unit
400: cold water generation pipe
500: cooling unit
510: thermoelectric module
520: heat transfer member
530: heating pipe
600: heat insulating member
610: heat insulating body unit
611: sink exposing hole
620: heat insulating cover unit
621: member exposing hole
BT: bolt
FT: fitting member
ST: temperature sensor

The invention claimed is:

1. A cold water generating apparatus, comprising:
an apparatus body;
a water tank which is provided in the apparatus body and which accommodates water flowing in from a water supply source;
a cold water generation pipe which is provided in the apparatus body so as to be connected to the water tank, and which allows the water accommodated in the water tank to flow thereto, to then be discharged; and
a cooling unit which is mounted on an outer surface of the apparatus body, and which cools the apparatus body so that the water accommodated in the water tank and the water flowing in the cold water generation pipe is cooled,
wherein the apparatus body has a tank insertion space having one open side so that at least a portion of the water tank is inserted thereinto,
wherein the water tank includes a tank main body which is inserted into the tank insertion space and having one open side, and a tank cover which is coupled to the apparatus body so as to cover the one open side of the tank main body, and having an inlet which allows water from the water supply source to flow into the tank main body and a connector connected to the cold water generation pipe,
wherein the apparatus body and the water tank include a material having thermal conductivity of 10 W/(m·K) or higher at room temperature, and
wherein water flowing in from the water supply source is accommodated in the water tank and cooled by water flowing in the cold water generation pipe, and the water cooled in the water tank is discharged to outside after being cooled by the cooling unit while flowing in the cold water generation pipe.

2. The cold water generating apparatus of claim 1, wherein the apparatus body and the cold water generation pipe are made of metal, and the apparatus body and the cold water generation pipe are integrally formed by die casting.

3. The cold water generating apparatus of claim 1, wherein the cold water generation pipe is disposed on the apparatus body to surround the tank insertion space.

4. The cold water generating apparatus of claim 3, wherein the cold water generation pipe is formed to have a spiral shape on a side surface of the apparatus body so as to surround the tank insertion space of the apparatus body.

5. The cold water generating apparatus of claim 1, wherein the cooling unit comprises a thermoelectric module installed so that a cooling side thereof is in contact with a cold sink unit formed in the apparatus body.

6. The cold water generating apparatus of claim 5, wherein the cooling unit further comprises a heat transfer member connected to be in contact with a heating side of the thermoelectric module, and a heating pipe having one side thereof connected to the heat transfer member.

7. The cold water generating apparatus of claim 1, further comprising:

a heat insulating member surrounding the apparatus body and the tank cover.

8. A method of manufacturing a cold water generating apparatus comprising:

an operation of preparing a cold water generation pipe;

an operation of integrally forming the cold water generation pipe inside side parts of an apparatus body having a tank insertion space having one open side and a cold sink unit on a side surface, by performing die casting, wherein the cold water generation pipe is configured to surround the tank insertion space; and an operation of installing of inserting and installing a water tank into the tank insertion space, and connecting and installing a cooling unit to the cold sink unit, wherein the apparatus body and the water tank are formed of a material having thermal conductivity of 10 W/(m·K) or more at room temperature, wherein in the installation operation, a tank main body included in the water tank is inserted into the tank insertion space, and a tank cover having an inlet and a connector is connected to the apparatus body so as to cover one open side of the tank main body, wherein the water tank is connected to a water supply source, and wherein water flowing in from the water supply source is accommodated in the water tank and cooled by water flowing in the cold water generation pipe, and the water cooled in the water tank is discharged to outside after being cooled by the cooling unit while flowing in the cold water generation pipe.

9. The method of manufacturing a cold water generating apparatus of claim 8, wherein the apparatus body and the cold water generation pipe are made of metal.

10. The method of manufacturing a cold water generating apparatus of claim 8, wherein the cold water generation pipe has a spiral shape.

11. The method of manufacturing a cold water generating apparatus of claim 8, in the installation operation, the connector and one side of the cold water generation pipe are connected.

12. The method of manufacturing a cold water generating apparatus of claim 11, wherein in the installation operation, after inserting the tank main body into the tank insertion space, a heat insulating body unit included in a heat insulating member is configured to surround a portion of the apparatus body, and after the connector and one side of the water generation pipe are connected, a heat insulating cover unit included in the heat insulating member is configured to surround a rest of the apparatus body and the tank cover.

13. The method of manufacturing a cold water generating apparatus of claim 8, wherein the cooling unit comprises a thermoelectric module installed so that a cooling side thereof is in contact with the cold sink unit.

14. The method of manufacturing a cold water generating apparatus of claim 13, wherein the cooling unit further comprises a heat transfer member connected to be in contact with a heating side of the thermoelectric module, and a heating pipe having one side thereof connected to the heat transfer member.

* * * * *